May 25, 1965   J. A. GAYLORD   3,185,148
DISCONNECT DEVICE FOR SURVIVAL KITS
Filed March 22, 1962   3 Sheets-Sheet 1
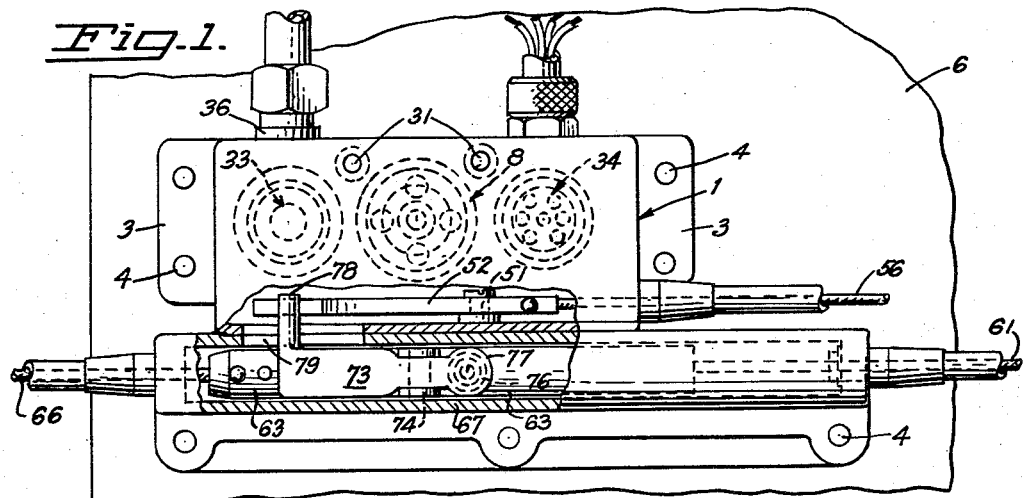
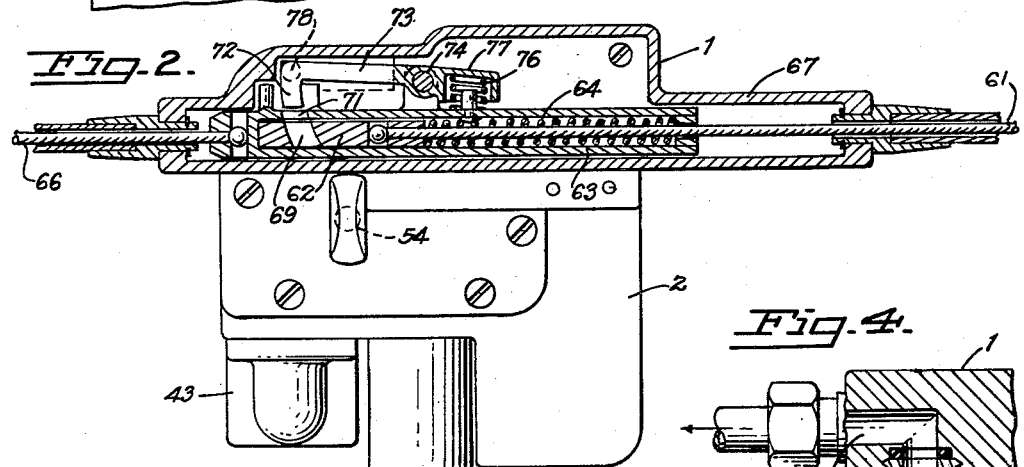
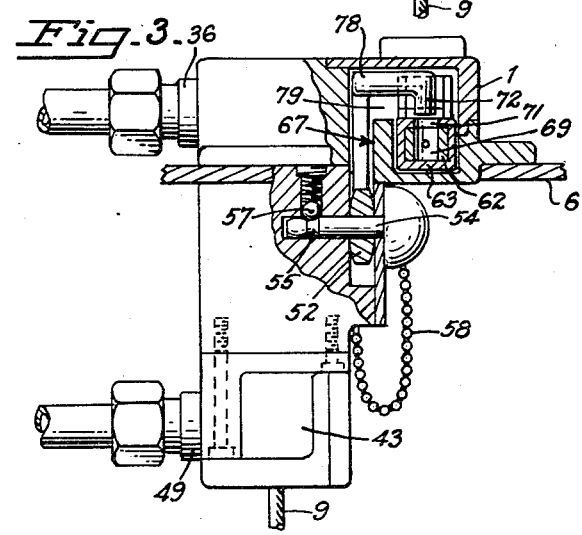
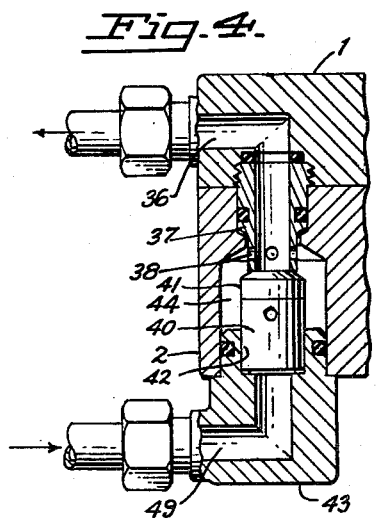
INVENTOR.
JOHN A. GAYLORD
BY George B. White
ATTORNEY.

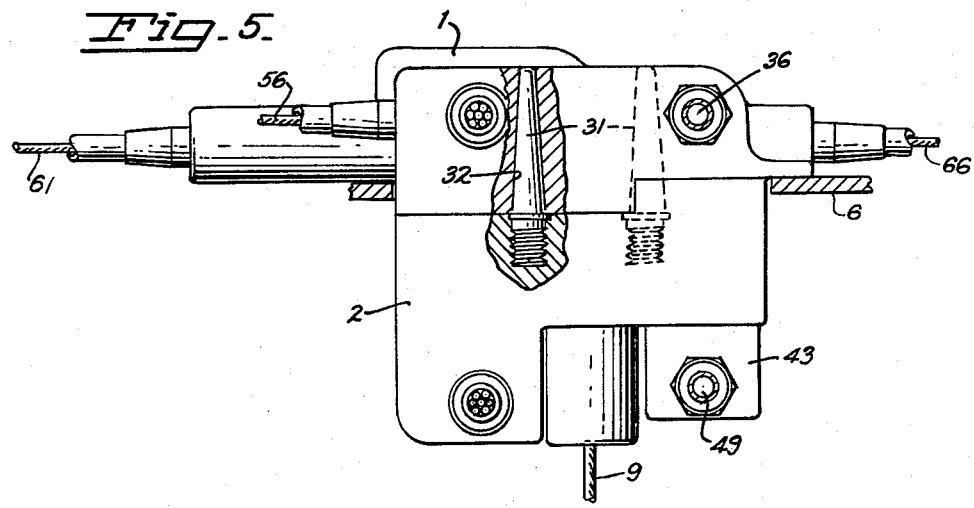
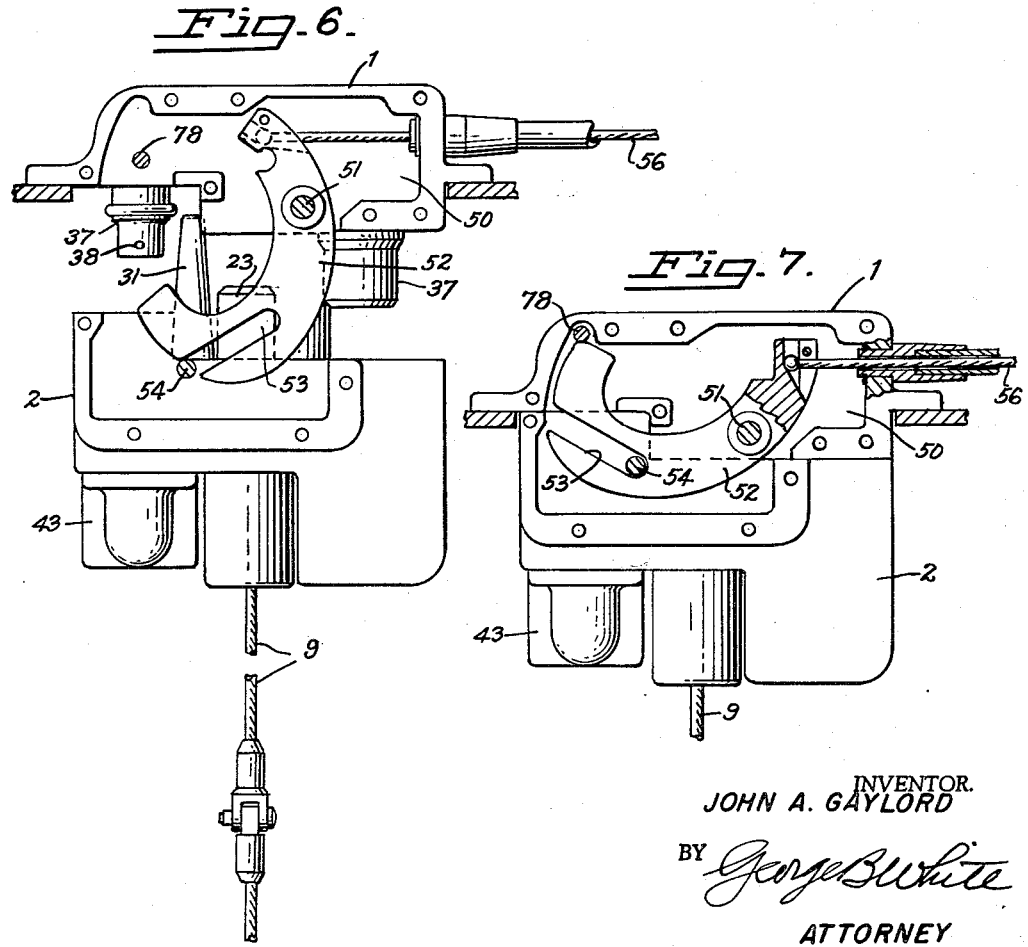

May 25, 1965  J. A. GAYLORD  3,185,148
DISCONNECT DEVICE FOR SURVIVAL KITS
Filed March 22, 1962  3 Sheets-Sheet 3
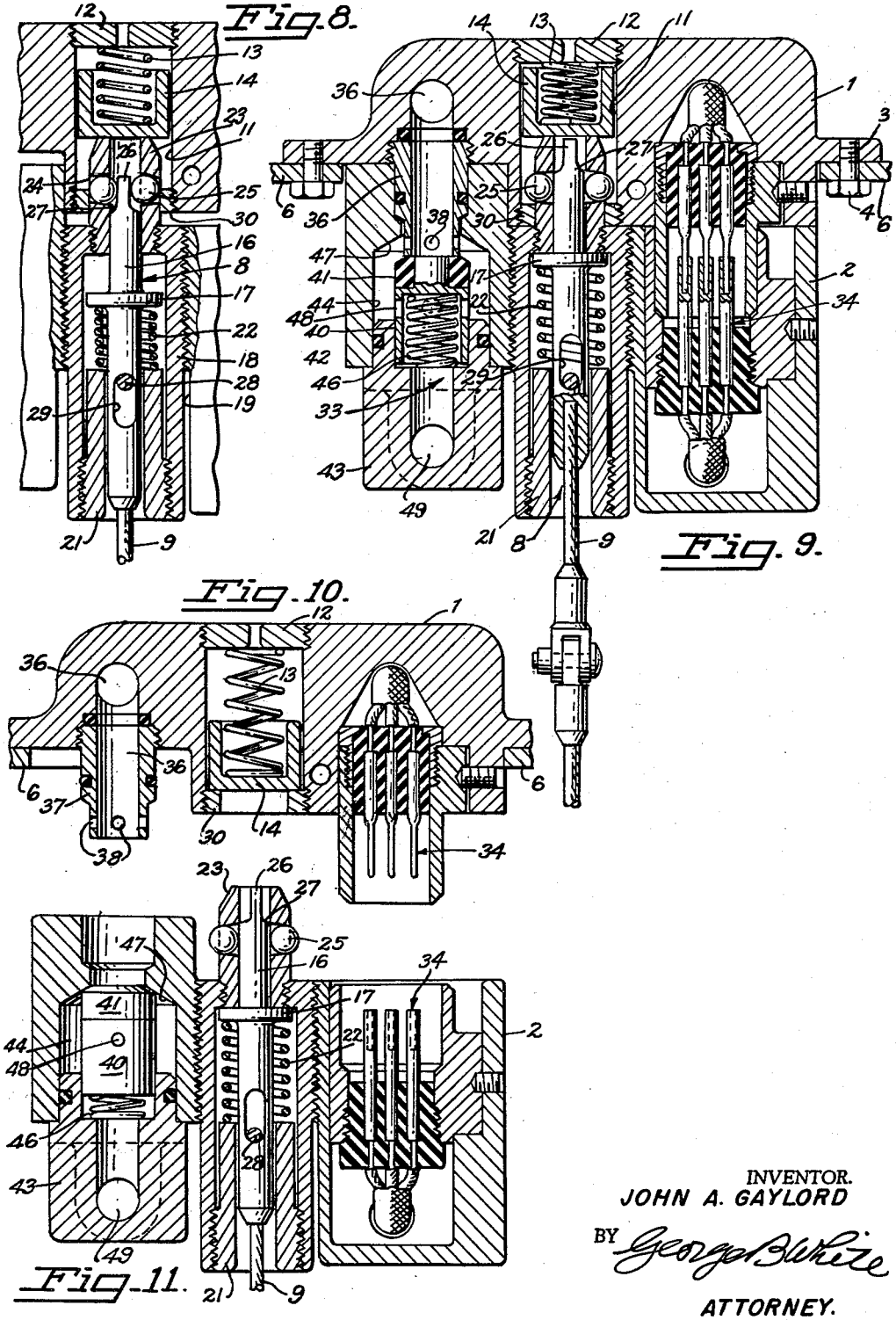
INVENTOR.
JOHN A. GAYLORD
BY
ATTORNEY.

United States Patent Office 3,185,148
Patented May 25, 1965

3,185,148
DISCONNECT DEVICE FOR SURVIVAL KITS
John Alden Gaylord, San Rafael, Calif., assignor to H. Koch & Sons, Corte Madera, Calif., a corporation of California
Filed Mar. 22, 1962, Ser. No. 186,579
14 Claims. (Cl. 128—142)

This invention relates to so called disconnect device for survival kits to be used in aircrafts of the type described in my United States Letters Patent No. 2,992,798, issued on July 18, 1961, and 2,992,567, issued on July 18, 1961.

In such survival kits there are many various devices and supplies necessary for the survival of aircraft personnel when ejected or escaping from an aircraft and especially in case of parachute descent. Such survival kits are usually in the form described in my said patents wherein the survival kit fits into the seat of the aircraft personnel so that it may be ejected automatically with the aircraft personnel when parachute descent is necessary.

The particular supplies concerned in connection with the present disconnect device are in addition to the electrical connections the alternation of the oxygen supply from the usual supply from the aircraft to the emergency oxygen supply from the kit, and also the arrangement whereby the actuation of the life raft inflating valve in the kit is positively prevented from actuation while the kit is in the aircraft but is actuated during parachute descent by the operation of the usual survival kit actuation handle.

The primary object of this invention is to provide a disconnect device for survival kits for the quick and positive connection and disconnection of personnnel oxygen and electrical lines of an aircrew man with the aircraft mounted supply systems and to automatically connect to emergency oxygen supply from the kit upon the separation of said disconnecting device.

Particularly it is an object of the invention to provide a disconnect device which upon separation from the aircraft automatically actuates the turning on of oxygen in the survival kit for suit pressure and breathing mask, the releasing of gas for inflating the life raft in said kit and unlocking the lid of said kit.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a top plan view of my disconect device partly in section.

FIG. 2 is partly sectional side view of the device.

FIG. 3 is a partly sectional end view of the device.

FIG. 4 is a fragmental sectional view of the device, the section being taken generally through the oxygen passages of the device.

FIG. 5 is a side view of the device showing in section the locating elements for the severable parts of the device.

FIG. 6 is a partly sectional side view of the device showing the automatic actuator for the emergency oxygen supply line in position when the parts are disconnected.

FIG. 7 is a partly sectional side view showing the automatic actuator for the emergency oxygen supply line in position when the unit is connected.

FIG. 8 is a fragmental sectional view showing the releasable connecting mechanism for the parts of the device in position permitting disconnection of part.

FIG. 9 is a sectional view of the entire device in connected position.

FIG. 10 is a sectional view of the kit part of the device separated from the airplane body part, and FIG. 11 is a sectional view of the disconnected airplane body part of the device.

In the present invention the disconnect device includes a relatively stationary body located partly within the kit and hereinafter referred to as kit body 1, to which is detachably attached a removable body of the disconnect from the outside of the kit, hereinafter referred to as aircraft body 2. Various devices from the kit body 1 are connected to corresponding devices or supply within the survival kit while various connecting devices leading from and to the aircraft body 2 are connected to corresponding supplies and devices in the aircraft.

The kit body 1 of the disconnect has flanges 3 thereon which are suitably secured such as by bolts 4 to the bottom 6 of a survival kit of the type described in my said copending applications. The flange 3 extends from a middle portion of the body 1 so that a top of the kit body 1 projects and extends through a conforming aperture 7 through said kit bottom 6 into the kit.

The kit body 1 and aircraft body 2 of the disconnect are releasably secured together by a releasable connection 8, the cord 9 of which is connected to the aircraft body so as to be automatically actuated whenever the aircrew man is ejected or parachutes from the aircraft.

This releasable connection 8 is contained partly in a bore 11 generally in the middle of the kit body 1 which bore is perpendicular with respect to the kit bottom 6 and is obstructed by a plug 12 on its inside end. A coil spring 13 is between said plug 12 and a compressor cup 14 so as to normally urge the cup 14 and the releasable connection 8 toward the releasing position. The releasable connection 8 includes a plunger 16 which has collar 17 thereon reciprocable in a bushing 18 fixedly secured in a bore 19 in the aircraft body 2 of the disconnect. In the outer end of the bushing 18 is secured a tubular sleeve plug 21 so as to engage the outer end of a coil spring 22 around the plunger 16 which coil spring 22 bears against the collar 17 to normally press it inwardly and to connecting postion and resist pull upon the line 9 until that pull reached a predetermined force. Into the inner end of the bushing 18 is threaded a tubular catch head 23 and provides an abutment shoulder to hold the head 17 against total escapement from the aircraft disconnect body 2. In the upper end of the catch head 23 within the bore 11 there are provided a plurality of radial holes 24 in which are held balls 25. The inner end of the plunger 16 is slidable through the central bore of said catch head 23. The inner end 26 of the plunger 16 is recessed to form pockets 27 to accommodate the balls 25 when the plunger 16 is pulled out sufficiently far to align the pockets 27 with the balls 25. The balls 25 are normally pushed out by the plunger 16 so as to rest upon a seat 30 fixed in the outer end of the bore 11. When the plunger 16 is pulled out and permits the balls 25 to recess into the pockets 27 of the upper portion 26, then the plunger 16 and the catch head 23 can be pulled out from the bore 11 to allow the separation of the kit body 1 from the aircraft body 2. The line 9 is anchored in the outer end of the plunger 16 for pulling the plunger 16 into ball releasing position. A suitable cross pin 28 in the sleeve plug 21 extending through a slot 29 in the plunger 16 limits the stroke of the plunger 16 and holds the plunger pockets 27 in registering position relatively to the balls 25.

The alignment of the kit body 1 and aircraft body 2 in proper relationship is accomplished by a pair of pilot pins 31 each of which is screwed in the aircraft body 2 and is tapered to fit into a correspondingly tapered hole or pocket 32 in the kit body 1.

The respective bodies 1 and 2 have complemental detachable connections such as oxygen connection 33 and the electrical line connections 34. An oxygen conduit or outlet 36 extends from the kit body 1 to one side and is suitably connected to the oxygen mask or suit of the aircrew man. The passage or conduit 36 turns at right angles inside of the body and terminates in an outwardly extended nipple 37. This nipple 37 has lateral holes 38 through its projecting end. This nipple 37 projects into the aircraft body 2. A hollow plunger 40 with a packing ring 41 on its top is reciprocably held in a pocket 42 of an intake plug 43 in the bottom of an intake chamber 44 in the aircraft body 2 and is urged by a coil spring 46 therein into sealing position with a valve seat 47 in the top of the intake chamber 44. The packing ring 41 also abuts aginst the bottom of the nipple 37 when the bodies 1 and 2 are in engagement so that the plunger 40 is pushed against the action of the spring 46 away from the valve seat 47 so as to permit oxygen to pass through the lateral intake holes 48 of said plunger 40 into the intake chamber 44 and then through the holes 38 to the passage 36. When the bodies 1 and 2 are separated, the spring 46 pushes this valve plunger 40 and its packing ring 41 against the valve seat 47 so that the intake chamber 44 is sealed automatically. The intake chamber 44 is suitably connected by a conduit 49 to the oxygen supply of the aircraft itself so that while the aircraft crew is within the aircraft, he can receive oxygen from the aircraft supply.

A suitable actuator is provided for the purpose of automatically actuating the valve of the emergency oxygen supply in the kit upon the separation of the aircraft body 2 from the kit body 1. This automatic actuator is disposed in the general arrangement to one side of the oxygen supply conduit, the disconnecting device and the electrical connection. In this part of the casing there is a flat recess 50 in the kit body 1 in which recess 50 is pivoted on a pivot 51 an actuating lever 52, as shown in FIGS. 6 and 7. The actuating lever 52 is arcuately curved and it has a longitudinal open slot 53 in an end thereof in the aircraft body 2, into which slot 53 fits a pin 54 extending transversely through the aircraft body 2 so that upon separation this pin 54 pulls or turns the handle or actuating lever 52 about its pivot 51 in a contra clockwise direction viewing FIG. 7. Upon the complete turning of the lever 52 the pin 54 is capable of being released from the slot 53 to allow the separation of the bodies 1 and 2 from one another. As the lever 52 is thus turned, it pulls an oxygen valve actuator line 56. The end of the oxygen valve actuator line 56 is connected to the other end of the lever 52. When the line 56 is pulled, it actuates a valve of the emergency oxygen supply in the kit so as to automatically supply oxygen to the breathing mask and suit of the person.

In order to permit the separation of the body 2 from the body 1 within the aircraft and without the actuation of the emergency oxygen supply when not needed, the pin 54 is removable, as shown in FIG. 3. The pin 54 has on it a groove 55 and is held in engaging position by a spring pressed catch 57 extended from the top of body 2, as shown in FIG. 3. The pin 54 can be pulled out, and in order to prevent it being lost, it hangs on a chain 58 secured to the side of the body 2. Thus when the pin 54 is pulled out, the body 2 can be separated from the body 1 without actuating the emergency supply valve. Such separation also automatically closes the oyygen inlet check valve so that the oxygen supply of the aircraft is not wasted.

The electrical connection may be any type of separable contact, connected by suitable conduit to the devices.

When the kit is still in the aircraft but the crewman wants to leave his seat and thus separate the aircraft body 2 from the kit body 1, it is important that the carbon dioxide valve for inflating the life raft be not actuated. Also it is important to prevent accidental actuation of the $CO_2$ valve while the survival kit is still in the aircraft but to be operable only after the crewman is ejected from the aircraft.

For this purpose there is provided a handle line 61 connecting the usual survival kit actuation handle of the type shown in my United States Letters Patent No. 2,994,231 issued August 1, 1961, to a plunger 62. The plunger 62 moves in a sleeve 63. In the sleeve 63 there is a spring 64 bearing against the plunger 62 normally to push the plunger 62 to the end of its stroke. The end of the sleeve 63 is connected to an actuating pull line 66 such as a valve actuating cord and the entire assembly is slidable longitudinally in a generally tubular or channel portion 67 of the kit body 1. Normally the plunger 62 can be pulled separately against the action of the spring 64 inside of the sleeve 63.

The plunger 62 and the sleeve 63 have respectively registering keeper holes 69 and 71. A hooked end 72 of a connecting arm 73 is adapted to be inserted into the keeper holes 69 and 71 so as to lock the plunger 62 and sleeve 63 together for simultaneous movement for pulling the actuating pull line 66 for actuating the inflating valve and releasing the lid. The connecting arm 73 is pivoted on the sleeve 63 above the channel 67 on a transverse pivot 74. A coil spring 76 in a cup 77 on the end of the arm 73 beyond said pivot 74 normally urges the hooked end 72 of the arm 73 into the keeper holes 69 and 71.

In order to positively prevent engagement of the arm 73 with the keeper holes 69 and 71, the arm 73 is held in withdrawn or inoperative position by the flat lever 52 whenever the bodies 1 and 2 are connected together. A finger 78 extends laterally from the connecting arm 73 through a slot 79 in the adjacent casing wall and over the end of the arcuate lever 52 so as to be engaged by the latter whenever the lever 52 is turned into the connect position shown in FIG. 7. Thus the pulling of the actuating pull line 66 for raft inflation is positively prevented until the bodies 1 and 2 are separated so as to move the flat lever 51 into the actuating position, shown in FIG. 6. Thereupon the action of the spring 76 is permitted to move the arm end 72 into the keeper holes 69 and 71 for interlocking the plunger 62 and sleeve 63.

In operation, whenever the aircrew member sits down on the kit, he connects the aircraft body 2 to the kit body 1 in the position predetermined by the locating pins 31 and sockets 32. The electrical connections 34 are thus plugged in. The oxygen connection 33 is completed and the plunger valve ring 41 is pushed away from its valve seat 47 to open oxygen communication. The flat lever 51 is pushed up against the finger 68 into the position shown in FIG. 7 to hold the raft inflation actuating pull line 66 disengaged as heretofore described. Then the pin 54 is inserted in place to connect the flat lever 52 to the aircraft body 2 for automatic operation during disconnect. The catch head 23 is also snapped into the bore 11 of the kit body 1 so that the catch balls 25 project outwardly and lock the bodies 1 and 2 together. If the aircrew member wishes to leave his seat in the aircraft without actuating any of the devices in the kit, he pulls out the pin 54 and then pulls the release line 9 so as to permit the pulling of the aircraft body 2 off the kit body 1. In the event of ejection or parachuting the kit remains attached to the aircrew member's parachute and is ejected with him. The line 9 is pulled automatically so that the aircraft body 2 of the device is disconnected. As the bodies 1 and 2 are thus separated, the pin 54 pulls the flat lever 52 into the position shown in FIG. 6 and thus pulls the oxygen valve actuating line 56 in the kit to automatically supply oxygen from the kit mounted emergency supply system to the mask and suit of the aircrew member. The movement of the flat lever 52 releases the finger 78 and thus the arm end 72 is automatically inserted in the keeper holes 69 and 71 so as to permit the inflation of the raft in the kit whenever the handle line 61 is pulled. The same actuating pull line 66 also actuates the lock for the lid of the kit so as to simultaneously release the lid for hanging the kit as described in my said patents.

I claim:

1. In a disconnect device for aircraft survival kits,
a kit disconnect body adapted to be secured to said kit,
an aircraft disconnect body,
means to align said bodies in predetermined relation,
releasable means to secure said bodies together in said predetermined relation,
coacting oxygen flow control devices in said bodies to establish communicating conduits for said oxygen flow when said bodies are connected together,
an actuating pull line in said kit body,
a handle line in said kit disconnect body,
separable connecting device between said lines,
a second actuating line in said kit disconnect body,
a pivoted lever in said kit disconnect body to which said second actuating line is connected,
releasable means in said aircraft body to turn said pivoted lever during the separating movement of said body for pulling said second actuating line,
and means coacting with said lever to hold said connecting device separable while said bodies are connected together and until said lever is turned.

2. In a disconnect device actuating and control devices in an aircraft survival kit,
a kit disconnect body adapted to be secured to said kit,
an aircraft disconnect body,
and separable coacting devices in said disconnect bodies to establish connections for said actuation and control of devices in said survival kit when said bodies are secured together,
releasable means to secure said bodies together comprising a tubular catch head projecting from one of said bodies into the other body, having openings through its sides
a plurality of catch elements laterally adjustable in said tubular catch head so as to be adapted to be confined within the contour of said catch head and selectively to project through said openings beyond said contour,
means in the body into which said tubular catch head projects engageable by said catch elements when projected beyond the contour of said tubular catch head so as to prevent separation of said bodies,
a reciprocating member in said tubular catch head normally urging said catch elements outwardly to project beyond the contour of said tubular catch head,
and means for transmitting a pull to said reciprocating element to pull said element out of engagement with said catch elements so as to permit withdrawal of said catch elements into said tubular catch head.

3. The disconnect device, as claimed in claim 2,
wherein the said reciprocating element consists of a plunger reciprocable in said catch head,
recess formed in a portion of said plunger for accommodating said catch elements in said withdrawn position,
and a guide for said reciprocating element to maintain said recesses generally in line with the respective catch elements.

4. In a disconnect device, as defined in claim 3,
wherein each of said bodies has a cavity therein,
said cavities being in axial registry when the bodies are connected,
a retainer tube secured in said aircraft body,
said catch head extending from said retainer tube so as to project into the cavity of the kit body,
said catch element engaging means being an abutment member in the cavity of said kit body engageable by said catch elements in projected position to hold said catch head in the cavity of the said kit body and thereby to hold said body connected,
said reciprocable element being a plunger reciprocable in said catch head and engageable with said catch elements so as to push the catch elements outwardly into said projecting position,
a portion of said plunger being adapted to accommodate said catch elements in withdrawn position within the confines of said catch elements,
resilient means in said tube to normally urge said plunger in position to push said catch elements outwardly into projection position,
said means for transmitting a pull reciprocating said plunger against said resilient means to shift said plunger into position to align said accommodating portions thereof with said catch elements to permit withdrawal of said catch elements from locking position and to permit the disengagement of said bodies.

5. A disconnect device, as defined in claim 2,
wherein resilient means are provided within the cavity of said kit body opposite said catch head for urging said catch head outwardly of said cavity of said kit body.

6. The disconnect device as claimed in claim 2,
wherein a tubular element is secured in the cavity of said aircraft body,
said catch head extending from said tubular element,
a plug secured in the bottom of said tubular element to form a guide for said reciprocating element,
said reciprocating element having recesses therein to accommodate said catch element in withdrawn position with the contour of said catch head,
resilient means in said tubular element for urging said reciprocating element normally into position to urge said catch elements outwardly,
and means to guide said plunger in a predetermined relation to said catch elements and to limit the stroke of said plunger.

7. The disconnect device, claimed in claim 6,
and resilient means in said cavity of said kit body bearing against said catch head and urging it outwardly of said cavity to facilitate disengagement when said catch elements are withdrawn.

8. In a disconnect device for aircraft survival kit,
a disconnect body adapted to be secured to said kit,
an aircraft disconnect body,
releasable means to secure said bodies together in predetermined relation,
a device for actuating a raft inflator valve and other device in said kit at will,
comprising a tubular element,
a guide in said kit body in which said tubular element is slidable,
a plunger reciprocable inside said tubular element,
an actuating line anchored to an end of said tubular element and connected to said device in said kit,
a handle line connected to said plunger and adapted to be connected to a manipulating device on said kit,
resilient means in said tubular element normally to urge said plunger into a predetermined initial position in said tubular element,
keeper apertures in said tubular element and said plunger registering in said initial position,
a connecting ram in said kit body adapted to engage said keeper apertures to lock together said tubular element and said plunger for simultaneous movement,
and means to hold said connecting arm out of said keeper apertures while said bodies are connected and to release said connecting arm for engagement with said keeper apertures when said bodies are disconnected.

9. In a disconnect device as claimed in claim 8, wherein the said resilient urging means for the plunger are compressible without pulling said actuating line.

10. In a disconnect device as claimed in claim 8, wherein the said connecting arm is pivoted in said kit body on said tubular member,
resilient means to urge said selective connecting arm into keeper engaging position,
an abutment portion extending from said connecting arm,
and an element movable by disengagement of said aircraft body engaging said abutment to hold said connecting arm out of engagement from said keeper apertures.

11. In a disconnect device for aircraft survival kit defined in claim 8,
wherein an actuator lever is fulcrumed in said kit body adjacent said tubular element so located that a free end of said lever is adapted to engage a portion of said connecting arm to hold said arm out of said keeper apertures when said bodies are connected,
an actuating line being anchored in the other end of said lever to be pulled by said lever when said lever is turned around said pivot during the separation of said bodies,
a releasable connection between said aircraft body and said lever coacting to turn said lever away from said line and to pull said actuating line during the separation of said bodies.

12. In a disconnect device defined in claim 11, wherein said releasable actuating element includes a slot in said lever and a pin extended from the outside through said aircraft disconnect body into engagement with said slot so as to permit the withdrawal of said pin from said slot at will for allowing the removal of said aircraft body from the kit body without turning said lever.

13. In a disconnect device for aircraft survival kit,
a kit disconnect body adapted to be secured to said kit,
an aircraft disconnect body,
releasable means to secure said bodies together in a predetermined relation,
an actuating lever pivoted in said kit body and projecting into said aircraft disconnect body,
an actuating pull line connected to an end of said lever to be pulled thereby when the said lever is turned about its pivot by the separation of said bodies,
and releasable connection means between said aircraft body and said lever to turn said lever while said aircraft body is being separated from said kit body;
said connection means being removable at will so as to permit the separation of said aircraft disconnect body without turning said lever.

14. A disconnect device as defined in claim 13, wherein the other end of said lever being adapted to coact with other actuating devices in said kit body.

References Cited by the Examiner
UNITED STATES PATENTS 2,859,422 11/58 Oliveau _____ 339—16
2,990,596 7/61 Oliveau _____ 339—16

RICHARD A. GAUDET, *Primary Examiner.*